A. B. JONES.
ATTACHMENT FOR HAY LOADERS.
APPLICATION FILED SEPT. 24, 1909.
970,928.
Patented Sept. 20, 1910.
3 SHEETS—SHEET 2.
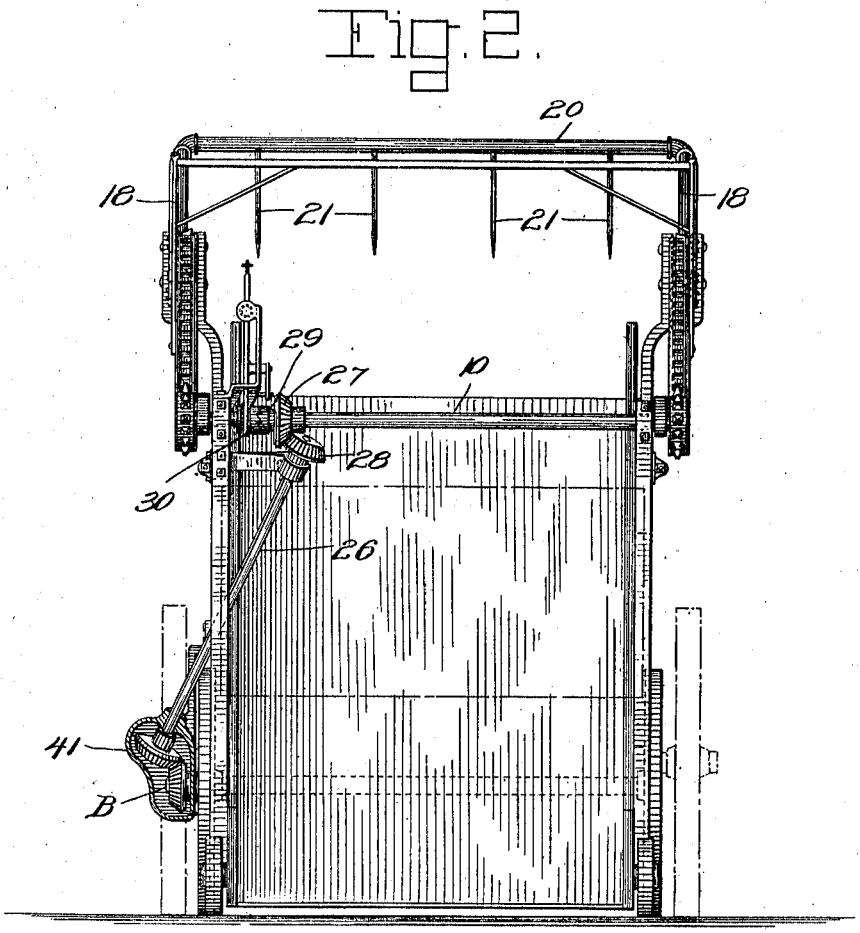
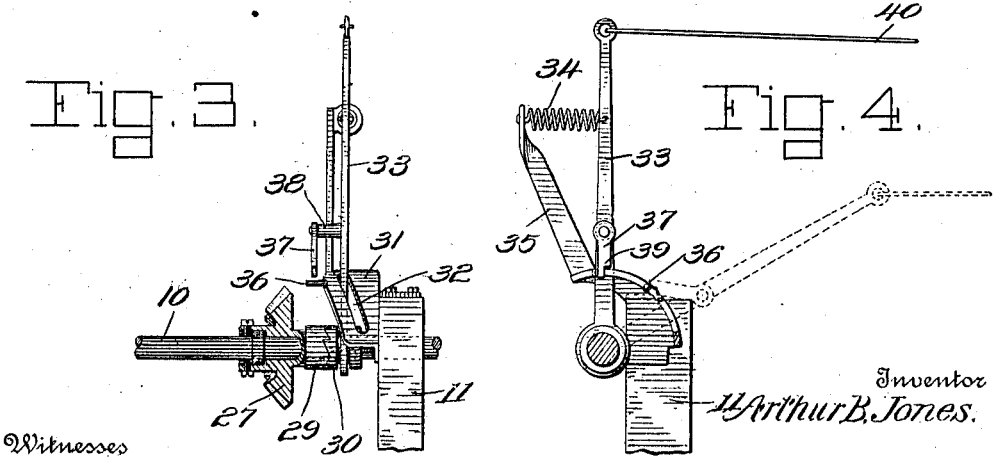
Witnesses
F. C. Gibson.
Wm Bagger.
Inventor
Arthur B. Jones.
By Victor J. Evans
Attorney

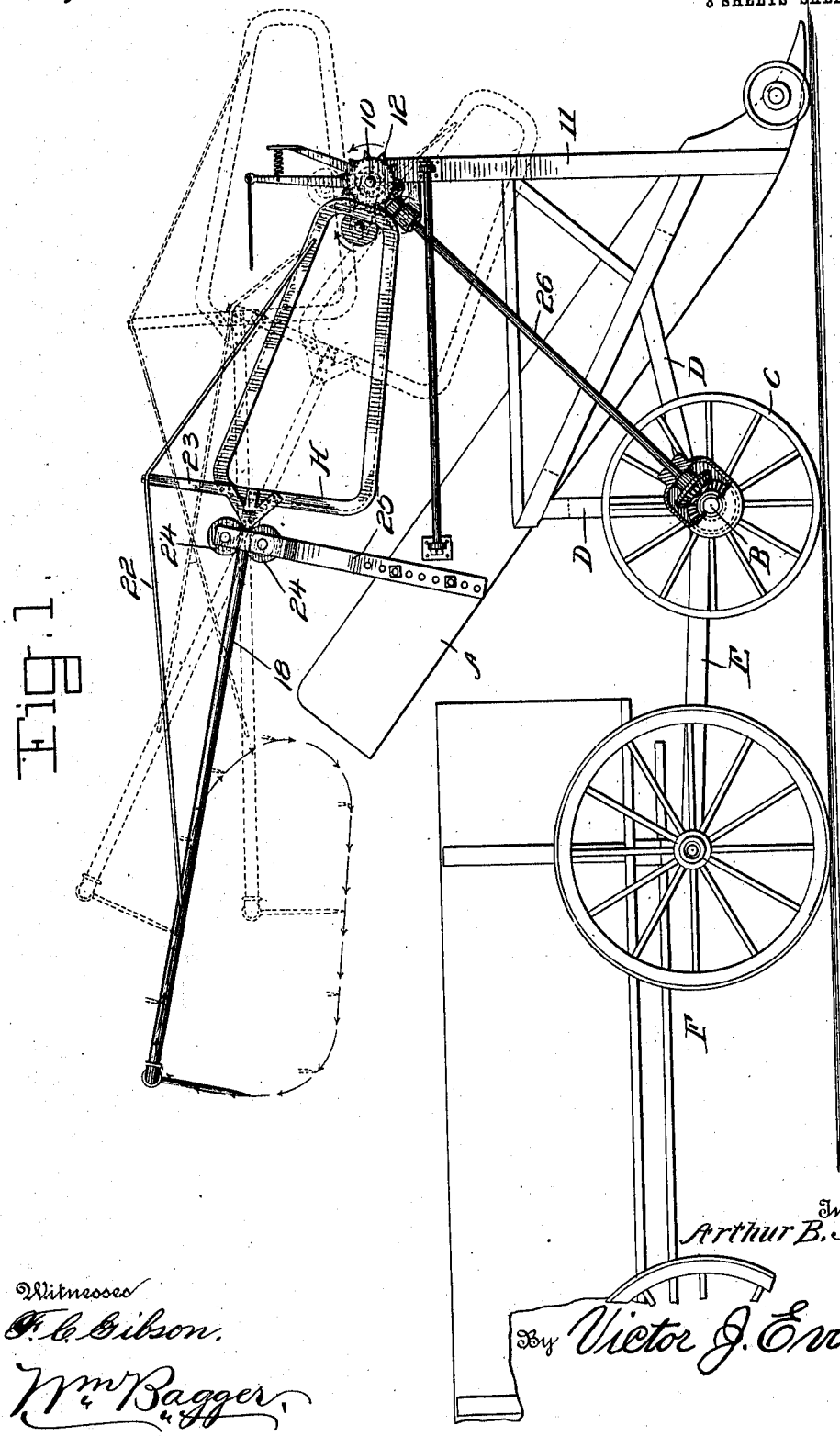

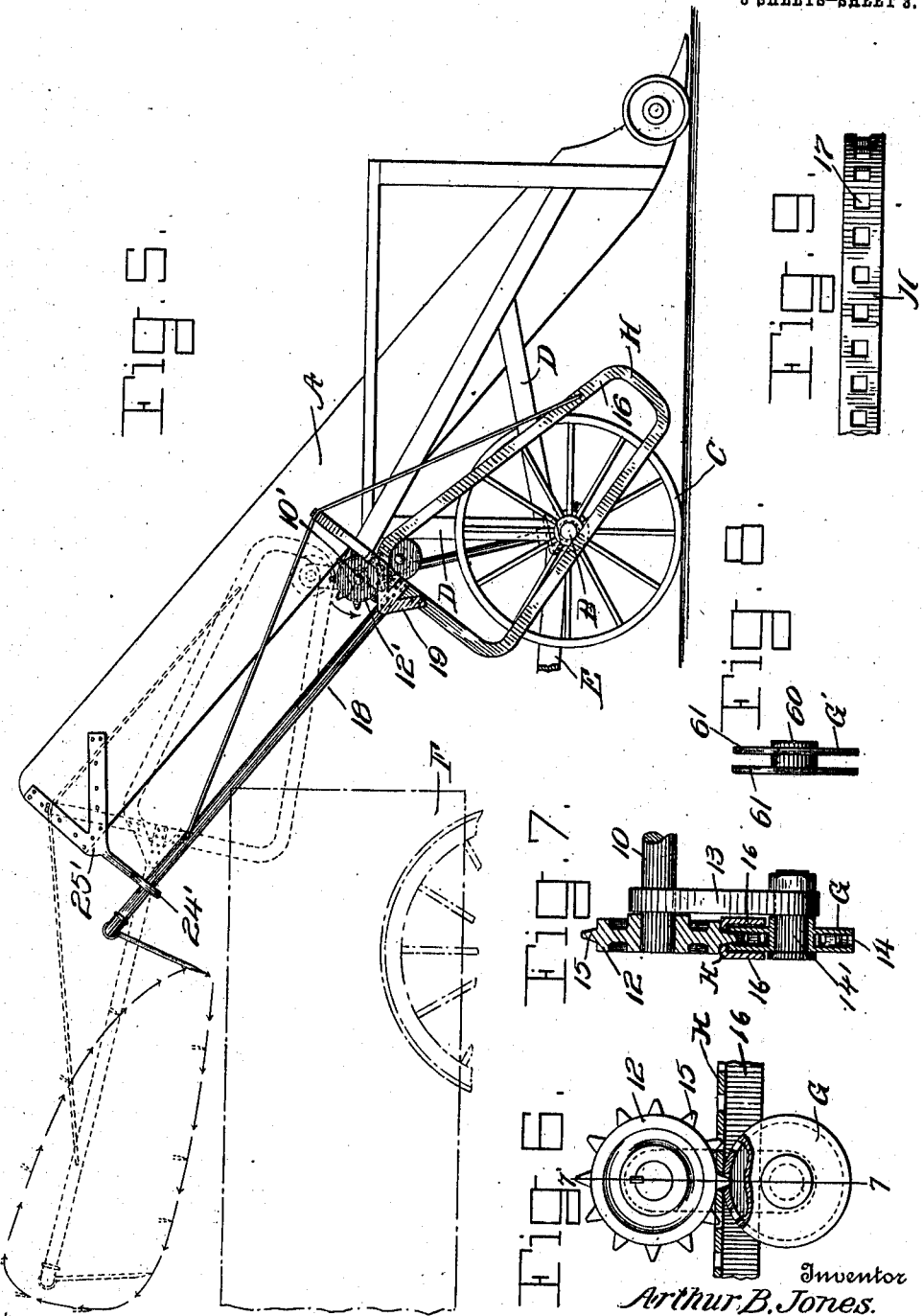

UNITED STATES PATENT OFFICE.

ARTHUR B. JONES, OF ST. JOHNS, MICHIGAN.

ATTACHMENT FOR HAY-LOADERS.

970,928.   Specification of Letters Patent.   Patented Sept. 20, 1910.

Application filed September 24, 1909. Serial No. 519,391.

*To all whom it may concern:*

Be it known that I, ARTHUR B. JONES, a citizen of the United States, residing at St. Johns, in the county of Clinton and State of Michigan, have invented new and useful Improvements in Attachments for Hay-Loaders, of which the following is a specification.

This invention relates to devices for loading hay and similar materials upon wagons for transportation and it has for its prime object to produce a device of this class whereby hay and the like may be loaded without manual labor.

The present invention relates particularly to an attachment adapted to be used in connection with conventional hay loaders of the "Dain" and other types which usually include an endless carrier which is supported by a suitable frame in an inclined position in advance of the bed of the wagon which is to be loaded; means being provided to facilitate the hay passing from the ground onto the endless carrier which latter dumps or deposits it in the forward end of the wagon box or upon the forward end of the rack or frame which is to be loaded; the device being pushed or propelled in advance of the vehicle over the field. Hay loaders of this type, while thoroughly practical and effective, are deficient in this respect, that the hay elevated thereby is deposited upon the forward end of the vehicle bed only, and manual labor of a somewhat strenuous nature is required to continually move the hay in a rearward direction upon the wagon bed.

By this invention it is proposed to provide a simple and efficient device, entirely automatic in its operation, whereby the hay as it is dumped from the upper end of the hay loader proper will be moved in a rearward direction upon the receiving bed of the wagon or vehicle.

A further purpose of the invention is to provide a device for the purpose indicated comprising a reciprocatory fork frame which is supported and actuated in such a manner that it will also vibrate, the fork teeth being raised to an elevated position when the frame moves in a forward direction.

A still further object of the invention is to provide simple and efficient operating means for the said fork frame.

Still further objects of the invention are to simplify and improve the general construction and operation of a device of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings have been illustrated simple and preferred forms of the invention, it being however understood that no limitation is necessarily made to the precise structural details therein exhibited, but that changes, alterations and modifications within the scope of the invention may be resorted to when desired.

In the drawings: Figure 1 is a side elevation showing a conventional hay loader equipped with one form of the improved attachment and showing also a portion of a vehicle upon which the hay is to be loaded. Fig. 2 is a front elevation of the hay loader equipped with the invention. Fig. 3 is a detail view in sectional elevation showing the clutch mechanism and the shipping lever for operating the same. Fig. 4 is a side elevation of the parts seen in Fig. 3 taken approximately at right angles to said figure. Fig. 5 is a side elevation illustrating a slightly modified form of the invention. Fig. 6 is a partly sectional detail view illustrating a portion of the movable track frame or fork guide and actuating means for the same. Fig. 7 is a sectional detail taken on the plane indicated by the line 7—7 of Fig. 6. Fig. 8 is a detail view in elevation illustrating a modified form of the guide wheel. Fig. 9 is a detail plan view of a portion of the track frame.

Corresponding parts in the several figures are denoted by like characters of reference.

The device constituting this invention may be used in connection with hay loaders of various patterns which are equipped with endless carriers for the purpose of elevating the hay from the ground and into the vehicle bed. The loader proper and the endless carrier of the same are not included in the present invention but for the purpose of illustrating the arrangement of the device of the present invention in conjunction with the loader, the casing of the latter has been conventionally shown at A, said casing being supported upon an axle B having transporting wheels C by means including the frame bars D. The loader proper is provided with a tongue E for connection with the wagon or other vehicle F that is to be loaded.

The loader frame is provided with bearings wherein a transverse shaft 10 is supported for rotation; these bearings may be in the nature of boxes supported upon uprights 11. The shaft 10 carries adjacent to each end a sprocket wheel 12, said sprocket wheels being fixed upon the shaft for rotation therewith and adjacent to each sprocket wheel, a link 13 is mounted for rotation upon the shaft, each of said links being equipped with a guide wheel G which is supported for rotation thereon by a pin 14' and which may be in the nature of a drum, the perimeter of which is pierced with apertures 14 adapted to be engaged by the teeth 15 of the sprocket wheels 12 from which the said guide wheels are slightly spaced to admit of the introduction of the guide frames H between said guide wheels and sprocket wheels. The guide frames H are of elongated approximately trapezoidal shape, the rear ends of said frames being longer than their front ends, and said frames being otherwise suitably shaped and constructed; each of said frames being formed with inwardly extending side flanges 16 to straddle the guide wheel G, and each of said frames being provided with apertures 17 for the passage of the teeth 15 of the sprocket wheels 12. It will thus be seen that when the parts are assembled, the guide frames will be gripped between the sprocket wheels 12 and the guide wheels G and that by the rotation of the sprocket wheels the guide frames will be given orbital movements around the said sprocket wheels, being held in contact with the sprocket wheels by the link supported guide wheels G which likewise move orbitally around the sprocket wheels.

Secured upon and extending rearwardly from each of the frames H is a rod or bar 18 the connection of which with the frame H is reinforced by braces 19; the rear ends of the rods 18 are connected by a cross bar or head 20 having teeth or prongs 21. The frames H, rods 18 and cross head 20 combine to constitute the fork frame which is reinforced by the truss rods 22 terminally connected with the frames H and the rods 18 and supported upon struts 23 which rise from the frames H. The rods or side bars 18 of the fork frame may be conveniently constructed of iron or steel pipe or tubing, and said rods are guided between pulleys or guide wheels 24 journaled upon brackets 25 which are adjustably secured upon the sides of the loader casing A; vertical adjustment of said brackets being desirable in order to properly adjust the fork frame for operation.

Rotary motion may be imparted to the shaft 10 in any convenient manner such as by means of a shaft 26 which is suitably geared to the axle B and to the shaft 10. The hub of the beveled gear 27 upon the shaft 10 which meshes with a beveled gear 28 upon the shaft 26 constitutes a clutch member 29 adapted to engage a clutch member 30 which latter is slidable upon the shaft 10 with which it is connected for rotation; the toothed gear 27 being loosely mounted upon the shaft 10. A plate or bracket 31 which is securely bolted upon the frame structure has an obliquely disposed slot 32 for the passage of a shipping lever 33 which is fulcrumed upon the clutch member 30 which latter, by rocking the lever in the slot 32 may be disengaged from the clutch member 29. A spring 34 connects the shipping lever 33 with an upright 35 extending from the plate 31 for the purpose of restoring the shipping lever to a position in which the clutch member 30 will engage the clutch member 29 for the purpose of imparting rotary motion to the shaft 10. The plate or bracket 31 has a laterally extending pin 36 lying in the path of a dog 37 which is pivoted upon a lug or stud 38 extending from one side of the shipping lever, said dog being provided with a notch or recess 39 which when the shipping lever is rocked in a direction to disengage the clutch will engage the pin 36, thus retaining the parts in non-operative position; to restore the parts to their normal or initial position, it is only necessary to rock the shipping lever still further against the tension of the spring 34 until the dog 37 slides out of engagement with the finger 36 when it will drop by gravity and ride over the finger 36 when the shipping lever is restored to its initial position by the traction of the spring 34. The shipping lever may be conveniently actuated by the driver of the vehicle to which the hay loader is attached, by means of a cord or rope 40.

The gearing which connects the shaft 26 with the axle B has been shown protected by a casing 41; suitable protected casings may be used at other points if thought necessary or desirable.

Under the modified form of this invention, which is illustrated in Fig. 5 of the drawings, the shaft here designated 10' carrying the sprocket wheels here designated 12' is supported in a plane in rear of the axle B instead of in front of said axle as shown in Fig. 1; I have also here substituted for the brackets 25 having the guide wheels 24 bracket members, one of which is shown at 25', the same having a guide eye 24' for the rods or side members 18 of the fork frame. In other respects the construction is substantially identical with that hereinbefore described.

In Fig. 8 of the drawings, has been shown a slightly modified form of a guide wheel for the track frames H; said guide wheel which is here designated G' consists of a hub 60 having a pair of spaced disks 61 between which the teeth 15 of the sprocket wheels 12 will be accommodated.

From the foregoing description, taken in connection with the drawings hereto annexed, the operation and advantages of this invention, will be readily understood by those skilled in the art to which it appertains.

It will be readily seen that the improved attachment is capable of being conveniently applied to a hay loader of conventional construction. When the hay loader equipped with the attachment is connected with a vehicle, upon which hay is to be loaded and is propelled over a field, the hay elevated by the loader proper will be dumped upon the bed of the vehicle. As the machine advances, the track frames move orbitally around the sprocket wheels 12, the fork frames being thus subjected to a vertical vibratory as well as to a longitudinally reciprocatory movement, the path of the fork teeth being outlined by the arrows in Figs. 1 and 5 of the drawings, it being thereby evident that the forks will engage the hay that is dumped upon the vehicle bed and shove or push the same in a rearward direction, thus enabling the vehicle to be loaded without necessity of pitching the hay by hand from the front toward the rear end of the vehicle bed.

The improved device as will be seen from the foregoing is simple in construction, and will be found to be thoroughly efficient for the purposes for which it is provided.

Having thus described the invention, what is claimed is—

1. An attachment for hay loaders including a fork frame, means for slidably supporting said frame, a track frame connected with the fork frame, and means for imparting to the track frame an orbital movement around the operating means.

2. An attachment for hay loaders including a fork frame, means for slidably supporting the same, a track frame connected with the fork frame, a sprocket wheel exteriorly engaging the track frame, and a guide wheel interiorly engaging the track frame and movable orbitally around the sprocket wheel.

3. An attachment for hay loaders including a fork frame, means for slidably supporting the same, a track frame connected with the fork frame, a shaft supported for rotation and carrying a sprocket wheel exteriorly engaging the track frame, a link supported upon the shaft adjacent to the sprocket wheel, a guide wheel upon said link interiorly engaging the track frame, and means for rotating the shaft.

4. In a device of the character described, a slidably supported fork frame, a track frame connected therewith, a sprocket wheel exteriorly engaging the track frame, a guide wheel interiorly engaging the track frame and holding the latter in engagement with the sprocket wheel, supporting means for the guide wheel whereby said wheel may move orbitally around the sprocket wheel, and means for rotating the latter to cause the track frame to move orbitally around said sprocket wheel.

5. In a device of the character described, a slidably supported fork frame, a track frame connected therewith, said track frame being provided with sprocket-engaging apertures, and a guide wheel interiorly engaging the track frame and supported for orbital movement around the sprocket wheel said guide wheel being constructed to accommodate the points of the sprocket teeth projecting through the apertured frame.

6. In a device of the character described, a slidably supported fork frame, a track frame connected therewith, said track frame being provided with inward extending flanges, a sprocket wheel supported for rotation and exteriorly engaging the track frame, and a guide wheel supported for orbital movement around the sprocket wheel and interiorly engaging the track frame, said guide wheel being accommodated between the flanges of the track frame.

7. In a device of the character described, a slidably supported fork frame, an apertured track frame connected therewith, a sprocket wheel supported for rotation and exteriorly engaging the track frame, and a guide wheel supported for orbital movement around the sprocket wheel and interiorly engaging the track frame, said guide wheel being provided with apertures to engage the points of the sprocket teeth projecting through the track frame.

8. In a device of the character described, a fork frame, a track frame connected therewith, a sprocket wheel supported for rotation and exteriorly engaging the track frame, and means for holding the track frame in engagement with the sprocket wheel while said track frame moves orbitally around the sprocket wheel.

9. In a device of the character described, a slidably supported fork frame, a track frame connected therewith, a shaft supported for rotation, and means connected with said shaft to engage the track frame and to move the latter orbitally around the shaft.

10. In a device of the character described, a slidably supported fork frame, a track frame connected therewith, a shaft supported for rotation, and means for gripping the track frame and for moving the same orbitally around the shaft, said means including a wheel supported upon the shaft, and a second wheel supported for orbital movement around the first wheel.

11. An attachment for hay loaders comprising a slidably supported fork frame, a track frame connected therewith, a shaft supported for rotation transversely of the hay loader, means connected with said shaft for gripping the track frame, and for moving the same orbitally around the shaft, said means including a wheel supported upon the shaft and a second wheel supported for orbital movement around the first wheel, a wheel-carrying axle supporting the hay loader, and means including a clutch for transmitting motion to the transverse shaft from the supporting means of the hay loader.

In testimony whereof I affix my signature in presence of two witnesses.

ARTHUR B. JONES.

Witnesses:
   JOE M. HOXIE,
   JOHN HARLEY.